United States Patent
Fass

[15] 3,683,516
[45] Aug. 15, 1972

[54] EDUCATIONAL DEVICES

[72] Inventor: Jerome S. Fass, 17 Sussex Road, Great Neck, N.Y. 11020

[22] Filed: June 5, 1970

[21] Appl. No.: 43,747

[52] U.S. Cl. ............................35/37, 35/35 C
[51] Int. Cl. ...................G09b 11/04, G09b 5/06
[58] Field of Search..........35/35 C, 35 D, 35 H, 35 J, 35/36, 37, 8 A

[56] References Cited

UNITED STATES PATENTS

| | | | |
|---|---|---|---|
| 2,369,572 | 2/1945 | Kallmann | 35/35 C |
| 2,822,425 | 2/1958 | Hicks | 35/35 C |
| 3,015,895 | 1/1962 | Stall | 35/35 D |
| 3,029,526 | 4/1962 | Olalainty | 35/36 X |
| 3,416,241 | 12/1968 | Weitzner | 35/35 C |
| 345,553 | 7/1886 | Starr | 35/36 |
| 2,997,306 | 8/1961 | Hicks | 35/8 A X |
| 3,197,892 | 8/1965 | Hancy | 35/37 |

FOREIGN PATENTS OR APPLICATIONS

| | | | |
|---|---|---|---|
| 670,476 | 9/1963 | Canada | 35/37 |

*Primary Examiner*—Wm. H. Grieb
*Attorney*—Peter L. Berger

[57] ABSTRACT

Educational devices involving the simultaneous use of the sight, auditory and tactile senses. An audio and visual signal is produced responsive to the movement of a tool or stylus which is manually controlled. In one application, the letters of the alphabet are preformed on a substrate panel, and, if correctly traced, the sound of the letter is audibly produced.

10 Claims, 4 Drawing Figures

Patented Aug. 15, 1972

3,683,516

INVENTOR.
JEROME S. FASS

EDUCATIONAL DEVICES

BACKGROUND OF THE INVENTION

This invention relates to educational devices and more particularly to educational devices which simultaneously involve a plurality of human senses to facilitate the learning process.

Such process has been subject to much discussion and a proliferation of theories and, recently, has taken on added significance with the increasing emphasis on early childhood development. Numerous approaches have been employed to involve the individual or child in a beneficial and effective learning environment and situation. Unfortunately, many of these approaches have not met with their prognosticated levels of success. Frequently, they use an arbitrary standard of progress developed and enforced from without the child. With the ever present "policeman" or teacher urging the child to fulfill the teacher's expectation, it has been found that significant learning problems have developed.

Many of the modern educational devices involve the child in a learning situation where the child sets his own rate of progress. Such devices and systems have met with increasing success both from the viewpoint of educational achievement and emotional stability of the child. Unfortunately, such systems involve only one or two human senses in the learning process. By enhancing the involvement of the child, it is felt that new educational levels may be easily, happily and fruitfully achieved.

Frequently, prior art educational devices, although attractive in theory, are not suitable for use in existing institutions, thus detracting from their effectiveness. This often results from the complex nature of the construction and operation of the devices, which tends to be too difficult for the child. Further, significant space is required to set up these devices, and they do not lend themselves to being portable. In addition, very few of the educational devices are suitable for consumer use because of their complexity and expense. Often such devices are unattractive, unreliable and not durable enough for use by young children.

An object of the present invention is to provide an improved educational device.

Another object of the present invention is to provide an educational device simultaneously involving a plurality of senses.

Still another object of the present invention is to provide an educational device which positively reinforces the learning experience.

Another object of the present invention is to provide an educational device which is attractive and durable.

Yet another object of the present invention is to provide an educational device which is suitable for use by young children.

Still another object of the present invention is to provide an educational device easily adapted for use in existing educational systems.

Another object of the present invention is to provide an educational device which is easy to use.

Another object of the present invention is to provide an educational device which is portable and does not take much space.

Other objects, advantages and features of the present invention will become more apparent from the following description.

SUMMARY OF THE INVENTION

In accordance with the principles of the present invention, the above objects are accomplished by providing an educational device comprising means for defining a predetermined path of movement which forms an alphanumeric symbol, controlled means capable of being manually controlled for following the predetermined path, display means for displaying the path of movement (alphanumeric symbol) traversed by the manipulative means, and audio means responsive to the traversed path of movement by the controlled means for sounding the alphanumeric symbol traced. By involving the sight, touch, and sound senses simultaneously while the predetermined path is being followed, it is believed the learning process will be enhanced.

As exemplary of the principles of the present invention, letters of the alphabet may be formed on a board or panel. A stylus capable of being manually controlled is used to trace the shape of the letter and simultaneously leaves a visual indication of the path of movement of the stylus while controlling an audio signal which sounds the letter being traced. For example, as the letter "a" is written by the child, "a" is sounded.

It may be appreciated that such a learning device may find wide applicability beyond the conventional educational institutions. For example, such an approach may be employed by industry for training employees to correctly operate and manipulate certain tools requiring complex movements. Providing an audio indication of such movement may serve to enhance the learning process, thus simplifying the training required for such jobs.

IN THE DRAWINGS

DETAILED DESCRIPTION

The principles of the present invention may find wide use in both educational and industrial areas. Recently, it has become increasingly important to provide an effective learning device for pre-schoolers and, especially, disadvantaged children. Numerous approaches have been tried and some have met with moderate success. It is felt that by involving a plurality of senses simultaneously during the learning experience, the rate of progress will be significantly enhanced. The present invention will be illustrated as an aid in teaching alphanumeric symbols, such as the letters of the alphabet. If these letters can be learned more effectively, it is felt that the reading process should also be correspondingly aided.

In addition, the invention lends itself in learning to read, learning foreign languages, learning any subject using alphanumeric symbols such as mathematics and chemistry. It can also be used in learning such games as bridge and chess. It also can be used by hobbyists when making models.

Figure 1:
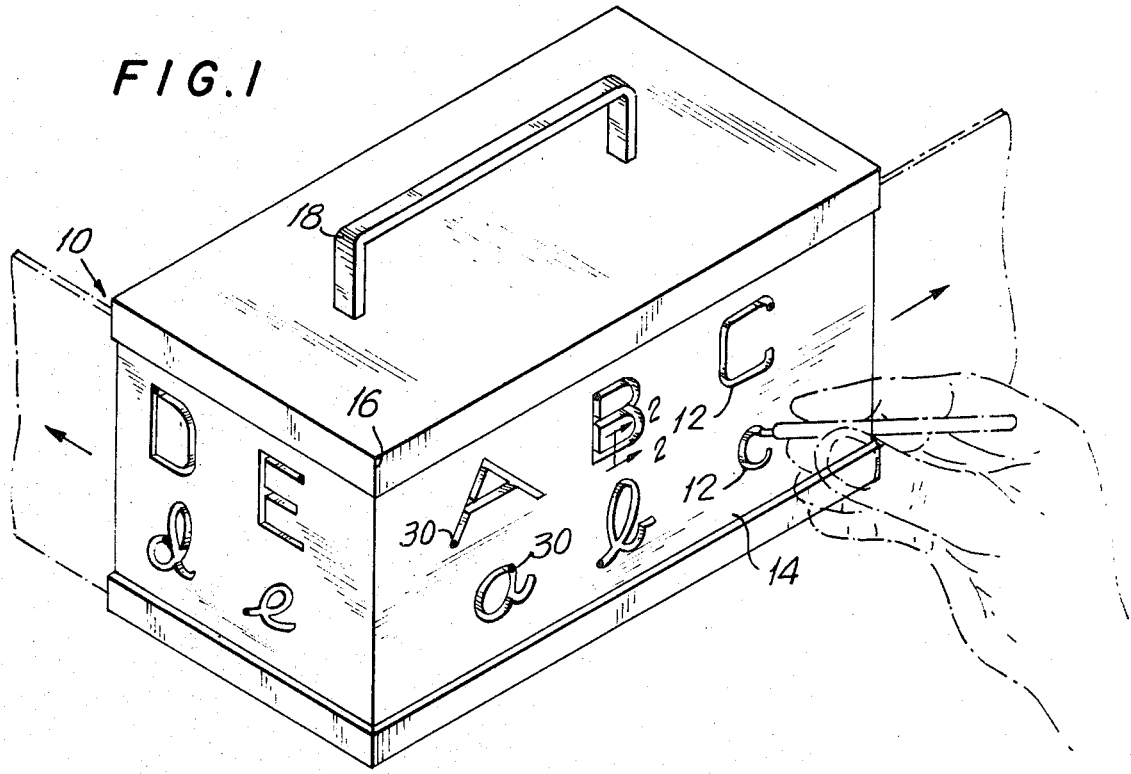
FIG. 1 is a perspective view of an embodiment of the educational device of the present invention.

FIG. 1 illustrates a cube-shaped assembly 10 for housing the present invention which may be placed on any flat surface. A plurality of letters 12 may be located on each side 14 of the cube or only on one side of the housing. Preferably, each side or panel 14 is replaceable by merely sliding the side out from a ledge or lip 16 located at the top and bottom of each side, thus making each side easily removable. Where desired, and where necessary, the sides 14 of the educational device will be permanently fixed or set in place. Preferably, the device 10 will be made of relatively light plastic materials, thus making it portable, durable and safe, and a handle 18 for carrying the device is attached to the top thereof.

Although the letters of the alphabet are shown in FIG. 1, it is understood that combinations of such letters forming words and a story could be provided with individual devices forming pages in a book. For such a book-like assembly, the educational device could be made as a panel. The constraints on the size and the shape of the device primarily are due to the electronic apparatus utilized therein. Where such apparatus is compact and suitable for mounting on the underside of the flat board or sheet, a panel-like assembly may be provided.

Figure 2A:
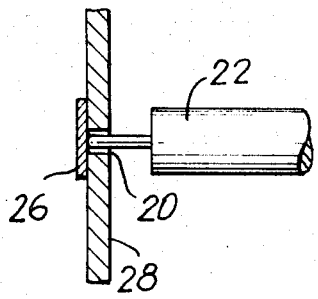
FIGS. 2a and 2b are cross-sectional views taken along lines 2—2 of FIG. 1 illustrating two configurations for letters to be traced.
Figure 2B:
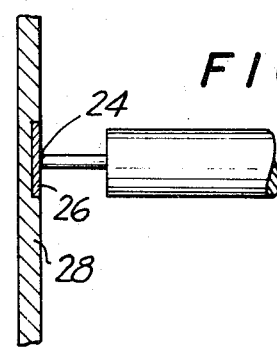

The symbols or letters on the sides 14 of the device 10 may be recessed as by a first means, such as a groove 20 illustrated in FIG. 2a, which forms a predetermined path, track or guide for a controlled means or stylus 22. Stylus 22 may be formed of any rigid material such as plastic. Rather than provide such a groove or recess for the letters, they may be formed in the surface 24 of the panel by embedding the letter form therein, as illustrated in FIG. 2b, with the corresponding associated apparatus located therebelow. As the stylus is moved in on the letter track, a visual mark or indication of such movement is produced. It is to be understood that the present invention is by no means limited to a stylus and board arrangement but is suitable for any tool or other device which is to be moved in a predetermined manner or path. Where training employees to move such a tool, the present invention may provide a significant advantages over present methods of training.

Figure 3:
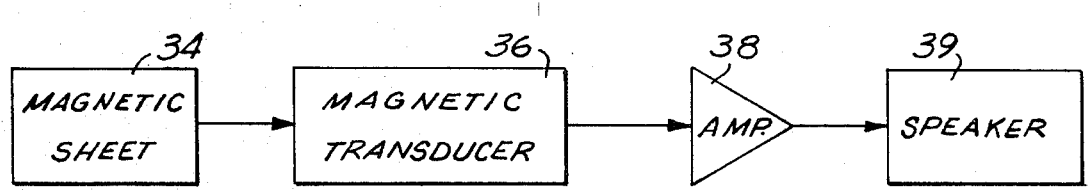
FIG. 3 is a block diagram of a system for producing an audio signal responsive to the movement of a stylus.

FIG. 3 illustrates one embodiment for converting the motion of the stylus to an audible signal which is responsive to the movement of the stylus. Several approaches may be employed in obtaining such a result and that illustrated in this Figure is only illustrative.

With particular reference to FIGS. 2a and 2b, a coded sheet of material 26 is embedded in a substrate 28 and is located directly below the track of the letter. The coded sheet of material may be either magnetically or optically sensitive and is provided with information corresponding to a predetermined letter. As the letter is traced by the stylus, the coded information is sensed and converted to an audio signal sounding the traced letter. When the stylus is removed therefrom at any point in the track 20, the sound will be interrupted. The rate of speed at which the stylus is moving will control the quality and frequency of the sound produced. Further, a starting point for each letter may be provided by a suitable mark 30.

The coded sheet may be provided with a prerecorded magnetic or optical message. As illustrated in FIG. 3, when a magnetically sensitive recording 34 is utilized, the stylus will be provided with a suitable magnetic transducer 36 such as a conventional needle to convert the magnetic information into usable electrical form. The output of the transducer is connected to the input of an amplifier 38, the output of which is supplied to a speaker 39. The transducer 36, amplifier 38, and speaker 39 may all be housed in the stylus, thus providing a compact assembly. Since the power required to drive the amplifier and speaker is not excessive, small portable batteries may also be housed in the stylus providing a self-contained transducer, amplifier, and speaker unit. It may be appreciated that such a stylus will reproduce the information recorded on a magnetic sheet and will provide different sounds without needing to alter the stylus. Therefore, one stylus can reproduce any letter prerecorded on a board or even any combination of letters, words, or numbers. Further, by providing an interchangeable slide assembly for the boards or panels 14, a complete story may be placed in a single educational device. Where desired, directional sensitivity may be advantageously employed to prevent the production of an audio signal during a retrace of the predetermined path. The circuitry for this function is not shown, since it is conventional.

Since the only power required will be that to drive the speaker and amplifier, the required power supply may be portably housed within the stylus. In addition, the amplifier and speaker also can be housed within the stylus providing a compact and efficient device, as described above. Preferably, the stylus will be made of a relatively durable material such as plastic, which will be attractive, yet sturdy enough to prevent its destruction by a child.

The present invention has been described for learning letters of the alphabet. It may be appreciated that such a system can be used for learning words in any language. Further, such an educational device also may be useful in industrial training programs, as described above.

It will thus be seen that the objects set forth above, among those made apparent from the preceding description, are efficiently attained and, since certain changes may be made in the above article without departing from the scope of the invention, it is intended that all matter contained in the above description and shown in the accompanying drawing shall be interpreted as illustrative and not in a limiting sense.

I claim:

1. An educational device comprising first means for defining a predetermined path forming an alphanumeric symbol, controlled means capable of being manually controlled for following said alphanumeric symbol, visual means for providing a visual indication of the alphanumeric symbol transversed by said controlled means so that said alphanumeric symbol is displayed, and audio means responsive to the movement of said controlled means in said predetermined path for forming said alphanumeric symbol providing an audio signal sounding said symbol as said controlled means moves in said predetermined path.

2. An educational device as set forth in claim 1, wherein said controlled means houses said audio means.

3. An educational device as set forth in claim 1, wherein said controlled means is a stylus.

4. An educational device as set forth in claim 3, wherein said stylus is made of a plastic type material.

5. An educational device as set forth in claim 1 comprising a panel member and receiving means, said receiving means being formed in the housing of said educational device, said panel member being slideable in said receiving means and including said alphanumeric symbol formed thereon.

6. An educational device as set forth in claim 5 wherein said panel member is removable from said device and replaceable by another panel member.

7. An educational device as set forth in claim 5, wherein said first means for defining said predetermined path is embedded in the surface of said panel.

8. An educational device as set forth in claim 5, wherein said first means comprises a groove in said panel.

9. An educational device as set forth in claim 1, wherein said first means for defining said predetermined path comprises a magnetically coded sheet of material, said magnetically coded sheet of material being provided with coded information, said controlled means comprising a magnetic transducer means for sensing said coded information as said controlled means traverses said predetermined path.

10. An educational device as set forth in claim 9, wherein said magnetic transducer means is mounted in one end of said controlled means.

* * * * *